United States Patent [19]

Uchiyama

[11] Patent Number: 4,508,190
[45] Date of Patent: Apr. 2, 1985

[54] SHIFT DEVICE FOR OPERATING A TRANSMISSION FOR A FOUR-WHEEL DRIVE VEHICLE

[75] Inventor: Shintaro Uchiyama, Fuchu, Japan

[73] Assignee: Fuji Jukogyo Kabushiki Kaisha, Tokyo, Japan

[21] Appl. No.: 384,823

[22] Filed: Jun. 3, 1982

[30] Foreign Application Priority Data

Jun. 9, 1981 [JP] Japan ................................. 56-88587

[51] Int. Cl.³ ..................... B60K 23/08; B60K 41/22; F16H 57/06; G05G 9/08
[52] U.S. Cl. ............................... 180/247; 74/473 R; 74/477; 74/745; 180/75.1; 192/3.63
[58] Field of Search ................. 180/247, 233, 70 MS, 180/75.1; 74/475, 473 R, 477, 333, 745; 192/993, 3.63

[56] References Cited

U.S. PATENT DOCUMENTS

| | | | |
|---|---|---|---|
| 2,357,781 | 9/1944 | Randol | 180/247 X |
| 3,283,298 | 11/1966 | Kaiser | 180/247 X |
| 3,452,614 | 7/1969 | Conkle | 74/477 |
| 3,529,487 | 9/1970 | Dolan | 180/247 X |
| 4,170,273 | 10/1979 | Kodama et al. | 180/233 |
| 4,203,498 | 5/1980 | Kodama | 180/70 MS |
| 4,241,621 | 12/1980 | Kodama | 180/247 X |
| 4,279,175 | 7/1981 | Breed et al. | 74/473 R |
| 4,356,879 | 11/1982 | Uchiyama | 180/247 |

FOREIGN PATENT DOCUMENTS 90755  7/1980  Japan .................................. 74/477

Primary Examiner—Joseph F. Peters, Jr.
Assistant Examiner—Mitchell J. Hill
Attorney, Agent, or Firm—Martin A. Farber

[57] ABSTRACT

A device for operating a transmission for a four-wheel drive vehicle, the power transmission system of which is selectively changed to two-wheel driving. The power transmission system selectively provides a two-wheel drive, a high range four-wheel drive and a lower range four-wheel drive via movement of a shift lever. The shift lever has a shift movement pattern which laterally changes direction at an intermediate position, such that the shift lever cannot be shifted from one end position to the other end position without passing the lateral direction change.

13 Claims, 6 Drawing Figures

SHIFT DEVICE FOR OPERATING A TRANSMISSION FOR A FOUR-WHEEL DRIVE VEHICLE

BACKGROUND OF THE INVENTION

The present invention relates to a shift device for operating a change transmission for four-wheel drive motor vehicles, which can also be driven selectively by only the front wheels or the rear wheels, and more particularly to a transmission having an auxiliary transmission combined with an ordinary main transmission and an auxiliary clutch device for disconnecting transmission of the power to a high gear ratio or a lower gear ratio, whereby the vehicle may be driven in a higher range four-wheel drive and a lower range four-wheel drive condition.

Such a transmission system is provided with a first shift-actuating device for the main transmission and a second shift-actuating device for the auxiliary transmission.

U.S. Pat. No. 4,170,273 discloses a shift lever for operating the auxiliary clutch device and the second shift-actuating device. Both devices are simply operated by shifting the shift lever along a straight line for selection of the two-wheel drive condition, a high range four-wheel drive condition and a lower range four-wheel drive condition. In order to position the shift lever at an intermediate position between the two-wheel drive position and the lower range four-wheel drive position, ball lock devices are provided. However, if the shift lever is operated with a powerful force from either the two-wheel drive position or the lower range four-wheel drive position, the shift lever is subject to pass beyond the intermediate position because of the weak action of the ball lock devices. Further, the operator may stop shifting the shift lever before the intermediate position, because the clicking action of the ball lock device is not felt, which results in an insufficient engagement in the transmission.

SUMMARY OF THE INVENTION

The object of the present invention is to provide a shift device for a transmission which ensures the shifting of the shift lever to the intermediate position between both shifting end positions, so that changing of the power transmission system are positively performed.

According to the present invention, there is provided a device for operating a transmission for a four-wheel drive vehicle having a first main drive shaft connected to a crankshaft of an engine through a first clutch, an auxiliary transmission provided adjacent to the first main drive shaft, a second main drive shaft provided adjacent the auxiliary transmission, the auxiliary transmission including reduction gear trains and a first shift fork manually operable to select transmitting speeds for transmitting the output of the first main drive shaft to the second main drive shaft, an ouput shaft provided in parallel with the second main drive shaft, a main transmission provided on the second main drive shaft and the output shaft, means for transmitting the output of the output shaft, the means comprising two transmitting systems for both front wheels and respectively rear wheels of the vehicle, a second clutch provided in one of the systems for connecting or disconnecting the respective transmitting system, a shift rail axially slidably provided for actuating the first shift-fork for the auxiliary transmission, which comprises an actuating rail slidably and rotatably provided in parallel with the shift rail; a fixed rail provided in parallel with the shift rail and actuating rail; a shift lever connected to the actuating rail, the shift lever having a shift pattern which changes direction at an intermediate position; a second shift fork slidably mounted on the actuating rail and fixed rail, the shift fork being operatively connected to the second clutch; an arm secured to the shift rail and slidably engaged with the actuating rail and fixed rail; first interlock means provided between the actuating rail and second shift fork and the fixed rail for causing the actuating rail and the second shift fork to come into fixed engagement relation to each other within a first moving range of the actuating rail, so as to shift the second shift fork by operating the shift lever, and for causing the second shift fork and the fixed rail to engage with each other within a second moving range of the actuating rail; and second interlock means provided between the actuating rail and arm and fixed rail for causing the actuating rail and arm to come into fixed engagement relation to each other within the second moving range of the actuating rail adjacent the first moving range thereby to shift the shift rail, and for causing the arm and fixed rail to engage with each other within the first moving range of the actuating rail, and a snap ring provided between the second shift fork and the arm on the actuating rail for moving the second shift fork and arm; the first and second interlock means being so arranged to be separated from the actuating rail by rotating the actuating rail by the shift lever.

The present invention will be more apparent from the following description made with reference to the accompanying drawings.

DETAILED DESCRIPTION OF PREFERRED EMBODIMENTS

Figure 1:
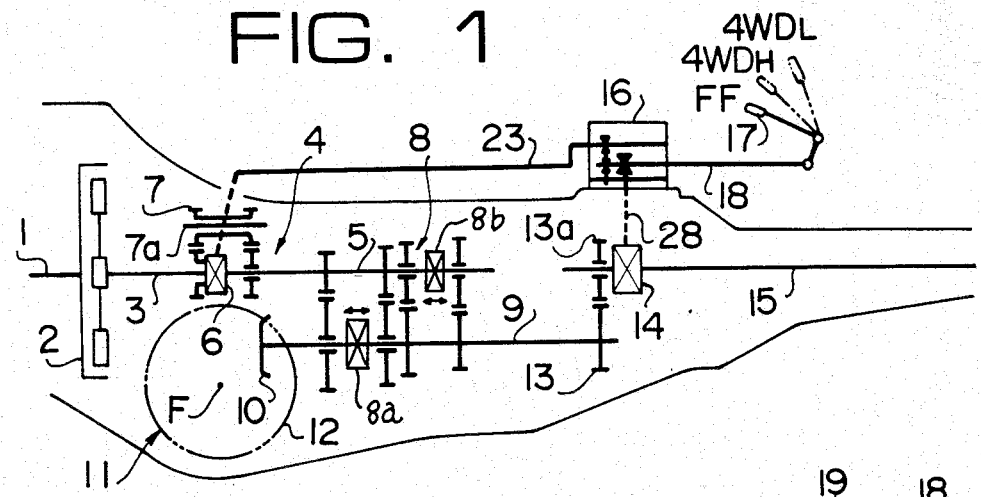
FIG. 1 is a schematic illustration showing an overall transmission which the present invention may be used.

Referring to the drawings, a crankshaft 1 of an engine which is longitudinally disposed in the front portion of a car is adapted to be rotatably connected to a first main drive shaft 3 through a clutch 2. The first main drive shaft is connected to a second main drive shaft 5 through a two-speed auxiliary transmission 4 positioned above the front axle F of the car. The auxiliary transmission 4 comprises a synchromesh mechanism 6 and counter gears 7 rotatably mounted on a counter shaft 7a. The synchromesh mechanism 6 selectively rotatably connects the first main drive shaft 3 with the second main drive shaft 5 either directly without gear reduction or through the counter gears 7.

The second main drive shaft 5 is in alignment with the first main drive shaft 3 and extends into a 4-speed main transmission 8. The main transmission 8 comprises an output shaft 9, a lower 2-speed transmission device, a higher 2-speed transmission device, and a pair of synchromesh mechanism 8a, 8b for selecting the speed change gears, and a reverse gear mechanism (not shown).

A drive pinion 10 is secured to one end of the output shaft 9 and the drive pinion meshes with a crown gear 12 of a final reduction gear device 11. The final reduction gear device is adapted to transmit the output of the output shaft 9 to front wheels of the car through the front axle F. The output shaft extends rearwardly and a transfer gear 13 is jointly rotatably mounted on the rear end of the output shaft 9.

A rear wheel drive shaft 15 is rotatably supported by bearings (not shown) and a gear 13a engaging with the gear 13 is freely rotatably mounted on the rear wheel drive shaft 15. A rear wheel drive synchromesh mechanism 14 of a second clutch is mounted on the rear wheel drive shaft 15 so as to selectively jointly rotatably engage the gear 13a with the shaft 15 to transmit the output of the output shaft 9 to rear wheels of the car.

Figure 2:
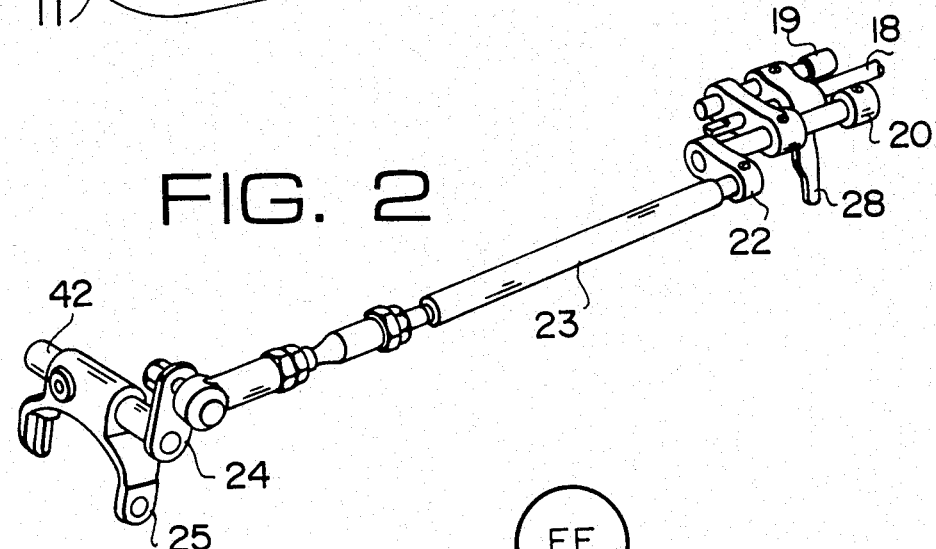
FIG. 2 is a perspective view showing a device according to the present invention.
Figure 3:
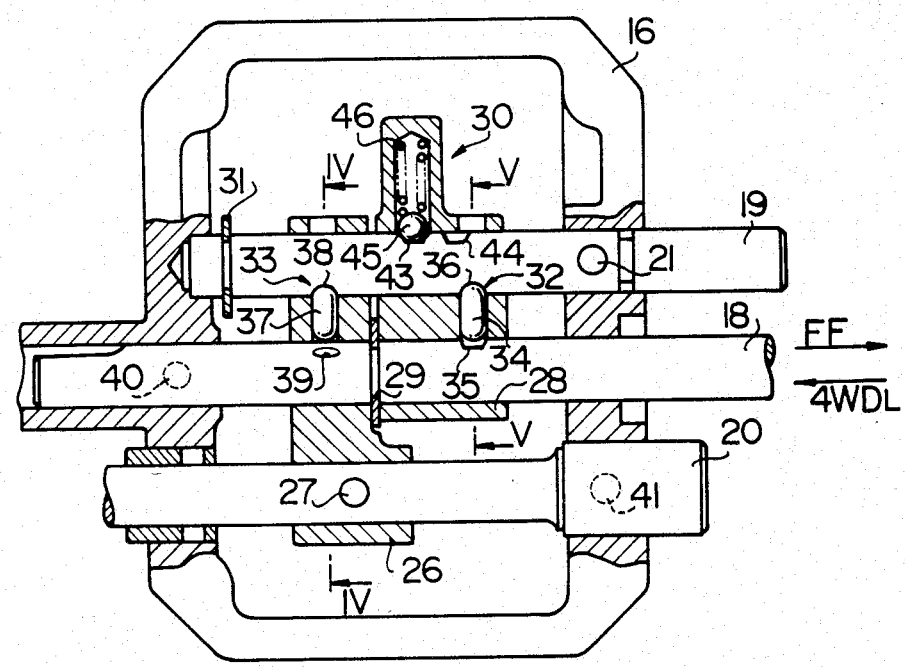
FIG. 3 is a plan, partially sectional view of a principal portion of the device of the present invention.

A device for operating the synchromesh mechanism 6 in the auxiliary transmission 4 and the synchromesh mechanism 14 on the rear wheel drive shaft 15 will be described hereinafter. Referring to FIG. 2, in the auxiliary transmission 4, a first shift fork 25 is secured to a shaft 42 and a lever 24 secured to the shaft 42 is pivotally connected to one end of a rod 23. The rear end of the rod 23 is connected to a shift rail 20 through a connecting member 22. The shift rail 20 is slidably supported in a case 16 as shown in FIG. 3.

In parallel with the shift rail 20, an actuating rail 18 is slidably and rotatably supported in the case 16 and a fixed rail 19 is secured to the case by a pin 21. The rails 18, 19, 20 are horizontally arranged (see FIG. 4). The rear end of the actuating rail 18 is connected to a shift lever 17.

Figure 6:
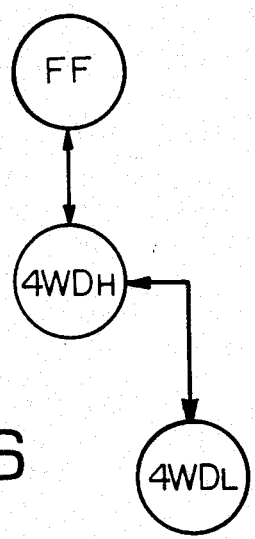
FIG. 6 is an illustration showing the shift pattern of the shift lever of the present invention.

The shift lever 17 is guided so as to be shifted in accordance with a pattern shown in FIG. 6. The shift pattern changes its direction of movement immediately after reaching the intermediate position from either direction. Its shifting movement pattern continues beyond the intermediate position at a lateral directional change from its previous movement approaching the intermediate position, in the embodiment example, by a perpendicular change of direction. More particularly the shift lever 17 is shifted between the front wheel drive position FF and the higher range four-wheel drive position 4WDH in the vertical projection position shown in FIGS. 4 and 5, and shifted between the 4WDH position and the lower range four-wheel driving position 4WDL in an inclined position shown by dotted dashed line.

An arm 26 is secured to the shift rail 20 by a pin 27 and relatively slidably engages the rails 18 and 19. A second shift fork 28 for the synchromesh mechanism 14 is slidably engaged with the actuating rail 18 and the fixed rail 19. A snap ring 29 is fixed to the actuating rail 18 between the arm 26 and the shift fork 28 so as to move the arm and fork respectively therewith. A snap ring 31 is secured to the fixed rail 19 so as to limit forward movement of the arm 26.

Figure 4:
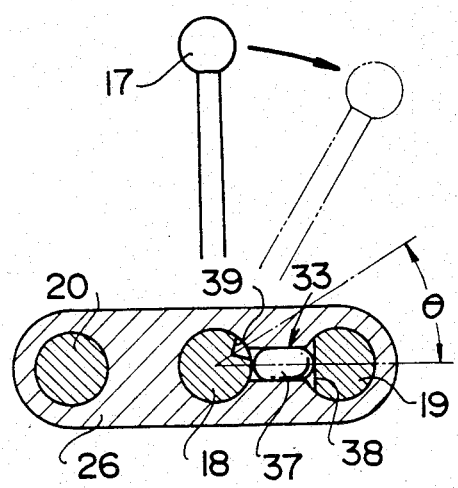
FIGS. 4 and 5 are sectional views taken along lines IV—IV and V—V of FIG. 3, respectively, with the shift lever shown in corresponding projection.
Figure 5:
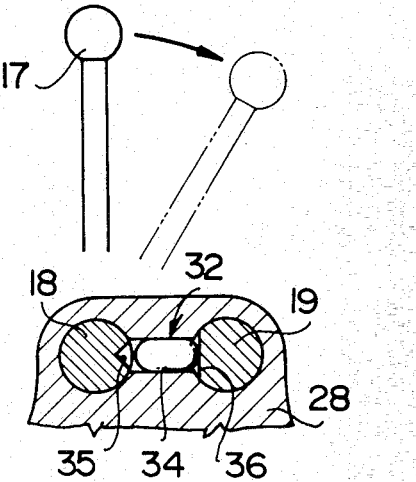

Between the actuating rail 18 and the fixed rail 19, a first interlock device 32 is provided. As shown in FIG. 5, the first interlock device 32 comprises an interlock pin 34 mounted slidably in the second shift fork 28 along a line connecting centers of both rails 18 and 19, a notch 35 in the rail 18, and a notch 36 on the rail 19. The notch 35 aligns with one end of the pin 34, when the shift lever 17 is in the vertical position as shown in FIG. 5. A second interlock device 33 is also provided between the rails 18 and 19. As shown in FIG. 4, the second interlock device comprises an interlock pin 37 mounted slidably in the arm 26 along a line connecting the centers of both rails 18 and 19, a notch 38 formed in the rail 19 and a notch 39 formed in the rail 18. Although the notch 38 is aligned with one end of the pin 37, the notch 39 is positioned in a position angularly deflected from the end of the pin 37 by an angle $\theta$, when the shift lever 17 is in the vertical position as shown in FIG. 4. A ball lock device 30 comprising notches 43 and 44 formed in fixed rail 19 and a ball 45 biased toward the rail 19 by a spring 46 in the shift fork 28 is provided to lock the shift fork 28 to the rail 19. A ball lock device 40 similar to the ball lock device 30 is provided between the actuating rail 18 and the case 16. A ball lock device 41 is also provided between the shift rail 20 and the case 16.

FIG. 3 shows the condition when the shift lever 17 is in the intermediate position, that is in the 4WDH position for the higher range four-wheel drive condition. When the shift lever 17 is held in the vertical projection position and shifted to the front-wheel drive position FF as indicated by the arrow in FIG. 3, the actuating rail 18 is shifted in a moving range to the right in FIG. 3. At that time, the shift fork 28 is moved to the right by the snap ring 29, so that the pin 34 is removed from the notch 36 by the slant of the notch 36 and engages in the notch 35. Thus, the shift fork 28 is shifted to the right by the snap ring 29, and the lock ball 45 leaves the notch 43 and engages the notch 44 of the fixed rail 19. In the FF position, a sleeve (not shown) in the synchromesh mechanism 14 is shifted to the right position, so that the gear 13a is disengaged from the shaft 15. Thus, the power of the engine is not transmitted to the rear wheels. The arm 26 is kept in the intermediate position by the engagement of the pin 37 with the notch 38 in the fixed rail 19.

In this position, the two-speed auxiliary transmission 4 is in the direct connection position. Thus, the power of the engine is transmitted through the clutch 2 and the first main drive shaft 3 to the second main drive shaft 5 without gear reduction by the auxiliary transmission 4. The main transmission 8 transmits the rotation of second main drive shaft 5 to the output shaft 9 by means of respective of the four speed change transmission gears. On the other hand, since the gear 13a is not in engagement with the shaft 15, the rear wheels of the car are not driven. Thus, only the front wheels are driven in the higher speed range without reduction by the auxiliary transmission 4.

When the shift lever 17 is shifted to the higher range four-wheel driving position 4WDH from the FF position, the actuating rail 18 is shifted to the intermediate position of FIG. 3 (still being in said moving range between FF and 4WDH in FIG. 6). Since the pin 34 engages the notch 35 of the actuating rail 18, the shift fork 28 is also shifted in the left direction together with the rail 18. On the other hand, since the shift lever 17 is in the vertical projection position and the notch 39 is not aligned with the pin 37, the arm 26 remains fixed to the fixed rail 19 by the pin 37 engaging in the notch 38. Thus, the leftward shifting of the actuating rail 18 stops when the snap ring 29 abuts the arm 26. Therefore, the shift lever is securely stopped at the 4WDH position. Thus, the synchromesh mechanism 14 is shifted to engage the gear 13a with the shaft 15. Accordingly, the shaft 15 is rotated through gears 13 and 13a. Since the shift rail 20 is not moved, the auxiliary transmission 4 is in the direct engaging stage. Thus, front and rear wheels are driven in higher speed range without reduction of the auxiliary transmission 4.

Since the pin 34 is aligned with the notch 36 in the condition of FIG. 3, the shift lever 17 can be rotated from the vertical projection position to the inclined position of FIG. 5 thereby rotating the actuating rail 18, and the pin 34 is removed from the notch 35 and engages with the notch 36 by the effect of the slanted shape of the notch 35. When the shift lever 17 is rotated to the inclined position shown by the dotted-dashed line in FIG. 4 and the horizontal path in FIG. 6, the notch 39 of the rail 18 aligns with the pin 37.

When the shift lever 17 is now shifted toward the low speed four-wheel driving position 4WDL in said inclined position thereof the actuating rail 18 is shifted in its other moving range to the left and finally reaches its extreme left end position. At that time, the fork 28 stays in the position of FIG. 3, since the pin 34 engages the notch 36. The arm 26 however is moved to the left by the snap ring 29, so that the pin 37 is shifted by the slanted shape of the notch 38, out from the notch 38 and engages in the notch 39. Thus, the shift rail 20 is moved together with the arm 26 and is stopped by engagement of the arm 26 with the ring 31 on the fixed rail 19 at the left end position. The movement of the shift rail 20 causes counterclockwise rotation of the lever 24 and shift fork 25 through the rod 23 thereby actuating the synchromesh mechanism 4 to effect the engagement between the synchromesh mechanism 6 and the counter gear 7. Therefore, the rotation of the first main drive shaft 3 is transmitted to the second main drive shaft 5 with reduction by the counter gear 7. The front and rear wheels are driven in the lower speed range.

When the shift lever 17 is moved from the 4WDL position to the 4WDH position in said other moving range—the lower vertical path in FIG. 6, the arm 26 is moved together with the actuating rail 18 by the engagement between the pin 37 and the notch 39 so as to thereby shift the shift rail 20 to the intermediate position (FIG. 3).

Since the pin 34 is engaged with the notch 36 of the fixed rail 19, the shift fork 28 is fixed to the rail 19. Therefore, when the ring 29 abuts with the shift fork 28, the actuating rail 18 is stopped. When the shift lever 17 is rotated to the vertical projection position, the shift lever can be shifted to the FF position as described above.

In the above-mentioned embodiment, although the front wheels were stated as being the main drive wheels and the rear wheels are the auxiliary drive wheels, it is possible to let the rear wheels be the main drive wheels and the front wheels be the auxiliary drive wheels.

In accordance with the present invention, the shifting movement pattern of the shift lever for operating the transmission of four-wheel drive vehicle changes its direction at the intermediate position. Therefore, the shift lever is securely stopped at the intermediate position to ensure the corresponding change in the power transmission. Further, the shift fork 28 for changing the four-wheel drive condition and the arm 26 for changing the synchromesh mechanism 6 from the actuating rail 18 and locked to the fixed rail 19 by rotating the actuating rail 18 at the intermediate position in the respective directions, since the interlocking devices 32 and 33 are separated from the actuating rail and engaged with the fixed rail. The ring 29 on the actuating rail abuts the locked shift fork or arm, respectively, so that the actuating rail is securely stopped at the intermediate position.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a device for operating a transmission for a four-wheel drive vehicle having a first main drive shaft connected to a crankshaft of an engine through a first clutch, an auxiliary transmission provided adjacent to said first main drive shaft, a second main drive shaft provided adjacent said auxiliary transmission, said auxiliary transmission including reduction gear trains and a first shift fork manually operable to select transmitting speeds for transmitting the output of said first main drive shaft to said second main drive shaft, an output shaft provided in parallel with said second main drive shaft, a main transmission provided on said second main drive shaft and said output shaft, two transmitting systems comprising means for transmitting the output of said output shaft to front wheels and rear wheels, respectively, of the vehicle, a second clutch in one of said two transmitting systems for connecting or disconnecting said one transmitting system, a shift rail axially slidably disposed for actuating said first shift fork for said auxiliary transmission, the improvement comprising:

an actuating rail slidably disposed in parallel with said shift rail and rotatably mounted;

a fixed rail disposed in parallel with said shift rail and said actuating rail;

a shift lever operatively connected to said actuating rail and movable in a path having a first path portion so as to slide said actuating rail in a first moving range and in a second moving range and a second path portion so as to rotate said actuating rail between said first and second moving ranges, said second path portion constituting a change of direction with respect to said first path portion;

a second shift fork slidably mounted on said actuating rail and said fixed rail, said second shift fork being operatively connected to said second clutch;

an arm secured to said shift rail and slidably engaged with said actuating rail and said fixed rail;

first interlock means provided between said actuating rail and said second shift fork and the fixed rail for causing said actuating rail and said second shift fork to come into fixed engagement relation to each other within said first moving range of said actuating rail when said shift lever is moved in one part of said first path portion, thereby to shift the second shift fork by operating said shift lever, and for causing said second shift fork and the fixed rail to engage with each other within said second moving range of said actuating rail when said shift lever is moved in another part of said first path portion;

second interlock means between said actuating rail and said arm and said fixed rail for causing said actuating rail and said arm to come into fixed engagement relation to each other within the second moving range of said actuating rail adjacent said first moving range thereby to shift said shift rail, and for causing said arm and said fixed rail to engage with each other within said first moving range of said actuating rail;

means disposed between said second shift fork and the arm on said actuating rail for moving said second shift fork and said arm respectively, and;

said arm and said second shift fork constitute members, said first and second interlock means being coordinated to said actuating rail such that between said moving ranges one of said interlock means remains effective as in one of said moving ranges, respectively, so as to keep one of said members engaged with said fixed rail until release thereof upon rotation of the actuating rail by operating said shift lever in said second path portion.

2. The device for operating a transmission in accordance with claim 1 wherein each of said first and second interlock means comprises, a pin radially slidably mounted so as to achieve said fixed engagement relation, and means comprising notches provided on said actuating rail and said fixed rail, each of said notches having slants for removing said pin by axial movement of said actuating rail, and said notches on said actuating rail are angularly offset with respect to each other.

3. The device for operating a transmission in accordance with claim 1 further comprising ball lock means for releasably locking said second shift fork to said fixed rail.

4. The device for operating a transmission in accordance with claim 1, wherein said moving means is a snap ring mounted on said actuating rail.

5. The device for operating a transmission in accordance with claim 1, wherein said moving means abuts said arm and said second shift fork when said actuating rail is between said first and second moving ranges.

6. The device for operating a transmission in accordance with claim 2, wherein interlock means respectively further comprises, said members being formed with guide slots in which said pins are slidably disposed, and portions of said fixed rail and said actuating rail defining said notches.

7. The device for operating a transmission in accordance with claim 2, wherein said slants of said notches in said fixed rail are inclined with respect to the longitudinal axis of said fixed rail, and said slants of said notches in said actuating rail are inclined with respect to a direction of rotation of said actuating rail and are offset at right angles with respect to said slants of said notches in said fixed rail.

8. The device for operating a transmission in accordance with claim 1, wherein said first and second path portions are perpendicular to each other.

9. The device for operating a transmission in accordance with claim 1, wherein said one part and said another part of said first path portion are parallel to each other.

10. In a device for operating a transmission for a four-wheel drive vehicle having a first main drive shaft connected to a crankshaft of an engine through a first clutch, an auxiliary transmission provided adjacent to said first main drive shaft, a second main drive shaft provided adjacent said auxiliary transmission, said auxiliary transmission including reduction gear trains and a first shift fork manually operable to select transmitting speeds for transmitting the output of said first main drive shaft to said second main drive shaft, an output shaft provided in parallel with said second main drive shaft, a main transmission provided on said second main drive shaft and said output shaft, two transmitting systems comprising means for transmitting the output of said output shaft to front wheels and rear wheels, respectively, of the vehicle, a second clutch in one of said two transmitting systems for connecting or disconnecting said one transmitting system, a shift rail axially slidably disposed for actuating said first shift fork for said auxiliary transmission, the improvement comprising:

an actuating rail disposed slidably back and forth along one direction in parallel with said shift rail and movable in another direction, respectively;

a fixed rail disposed in parallel with said shift rail and said actuating rail;

a shift lever operatively connected to said actuating rail and movable in a path having a first path portion so as to slide said actuating rail in a first moving range and a second moving range and a second path portion so as to move said actuating rail in said another direction between said first and second moving ranges, said second path portion defining a change of direction with respect to said first path portion;

a second shift fork slidably mounted on said actuating rail and said fixed rail, said second shift fork being operatively connected to said second clutch;

an arm secured to said shift rail and slidably engaged with said actuating rail and said fixed rail;

first interlock means provided between said actuating rail and said second shift fork and the fixed rail for being effective causing said actuating rail and said second shift fork to come into fixed engagement relation to each other within said first moving range of said actuating rail when said shift lever is moved in one part of said first path portion, thereby to shift the second shift fork by operating said shift lever in one direction of movement of said actuating rail, and for causing said second shift fork and the fixed rail to engage with each other within said second moving range of said actuating rail when said shift lever is moved in another part of said first path portion;

second interlock means between said actuating rail and said arm and said fixed rail for being effective causing said actuating rail and said arm to come into fixed engagement relation to each other within the second moving range of said actuating rail adjacent said first moving range thereby to shift said shift rail in said another direction of movement of said actuating rail, and for causing said arm and said fixed rail to engage with each other within said first moving range of said actuating rail;

means disposed between said second shift fork and the arm fixed to said actuating rail for moving said second shift fork in said first moving range in said another direction of movement of said actuating rail, and respectively, for moving said arm in said one direction of movement of said actuating rail in said second moving range and;

said arm and said second shift fork constitute members, said first and second interlock means being acted on by said actuating rail such that between said moving ranges one of said interlock means remains effective as in one of said moving ranges, respectively, keeping one of said members engaged with said fixed rail until release thereof upon movement of the actuating rail in said another direction by operating said shift lever in said second path portion.

11. The device for operating a transmission in accordance with claim 10, wherein
said first and second path portions are perpendicular to each other.

12. The device for operating a transmission in accordance with claim 10, wherein
said one part and said another part of said first path portion are parallel to each other.

13. The device for operating a transmission in accordance with claim 10, wherein
said shift lever is constrained to move only in said path including said first and second path portions by the cooperative combination of said improvement.

* * * * *